(12) United States Patent
Wang et al.

(10) Patent No.: US 10,447,847 B2
(45) Date of Patent: Oct. 15, 2019

(54) TERMINAL DEVICE AND INCOMING CALL PROCESSING METHOD

(71) Applicant: Huawei Technologies Co., Ltd., Shenzhen (CN)

(72) Inventors: Yahui Wang, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/762,312

(22) PCT Filed: Sep. 25, 2015

(86) PCT No.: PCT/CN2015/090738
§ 371 (c)(1),
(2) Date: Mar. 22, 2018

(87) PCT Pub. No.: WO2017/049591
PCT Pub. Date: Mar. 30, 2017

(65) Prior Publication Data
US 2018/0262612 A1 Sep. 13, 2018

(51) Int. Cl.
*G06F 3/147* (2006.01)
*H04M 1/725* (2006.01)
(Continued)

(52) U.S. Cl.
CPC .... *H04M 1/72583* (2013.01); *G06F 3/04817* (2013.01); *G06F 3/04883* (2013.01);
(Continued)

(58) Field of Classification Search
CPC .......................... H04M 1/72583; H04M 3/436
See application file for complete search history.

(56) References Cited

U.S. PATENT DOCUMENTS

2008/0316182 A1* 12/2008 Antila .................... G06F 3/044
345/173
2010/0162169 A1* 6/2010 Skarp .................... G06F 3/0488
715/833
(Continued)

FOREIGN PATENT DOCUMENTS

CN 101547255 A 9/2009
CN 101689088 A 3/2010
(Continued)

OTHER PUBLICATIONS

Machine Translation and Abstract of Chinese Publication No. CN103078991, dated May 1, 2013, 17 pages.
(Continued)

*Primary Examiner* — Tuan H Nguyen
(74) *Attorney, Agent, or Firm* — Conley Rose, P.C.

(57) ABSTRACT

A terminal device and an incoming call processing method to reduce user operations, where the terminal device includes a touch display screen, a pressure sensor, and a processor, where the touch display screen is configured to display an incoming call interface when the terminal device receives an incoming call, where the incoming call interface includes an incoming call number and a rejection icon. The pressure sensor is configured to determine a value of first pressure generated by the first touch operation when the terminal device detects a first touch operation on the rejection icon, and the processor is configured to reject the incoming call and initiate a first additional operation when the value of the first pressure that is determined by the pressure sensor exceeds a first threshold.

19 Claims, 5 Drawing Sheets

(51) Int. Cl.

| | |
|---|---|
| *H04M 19/04* | (2006.01) |
| *G06F 3/0481* | (2013.01) |
| *H04M 3/42* | (2006.01) |
| *H04M 3/436* | (2006.01) |
| *H04M 1/663* | (2006.01) |
| *G06F 3/0488* | (2013.01) |
| *H04M 1/60* | (2006.01) |

(52) U.S. Cl.
CPC ....... *H04M 1/663* (2013.01); *H04M 3/42221* (2013.01); *H04M 3/436* (2013.01); *H04M 19/04* (2013.01); *H04M 1/6041* (2013.01); *H04M 1/72552* (2013.01); *H04M 2250/22* (2013.01)

(56) References Cited

U.S. PATENT DOCUMENTS

| | | | |
|---|---|---|---|
| 2012/0268408 A1 | 10/2012 | Chen et al. | |
| 2014/0194161 A1* | 7/2014 | Du .................... | H04M 1/72527 455/557 |
| 2016/0014579 A1* | 1/2016 | Kasilya Sudarsan ... | H04W 4/16 455/417 |

FOREIGN PATENT DOCUMENTS

| | | | |
|---|---|---|---|
| CN | 101794196 | A | 8/2010 |
| CN | 101799737 | A | 8/2010 |
| CN | 103019490 | A | 4/2013 |
| CN | 103078991 | A | 5/2013 |
| CN | 104346062 | A | 2/2015 |
| EP | 2672687 | A2 | 12/2013 |

OTHER PUBLICATIONS

Machine Translation and Abstract of Chinese Publication No. CN104346062, dated Feb. 11, 2015, 18 pages.
Foreign Communication From a Counterpart Application, PCT Application No. PCT/CN2015/090738, English Translation of International Search Report dated May 18, 2016, 2 pages.
Foreign Communication From a Counterpart Application, PCT Application No. PCT/CN2015/090738, English Translation of Written Opinion dated May 18, 2016, 5 pages.
Foreign Communication From a Counterpart Application, European Application No. 15904467.6, Extended European Search Report dated May 29, 2018, 7 pages.
Machine Translation and Abstract of Chinese Publication No. CN101547255, dated Sep. 30, 2009, 6 pages.
Machine Translation and Abstract of Chinese Publication No. CN101689088, dated Mar. 31, 2010, 20 pages.
Machine Translation and Abstract of Chinese Publication No. CN101794196, dated Aug. 4, 2010, 20 pages.
Machine Translation and Abstract of Chinese Publication No. CN101799737, dated Aug. 11, 2010, 9 pages.
Machine Translation and Abstract of Chinese Publication No. CN103019490, dated Apr. 3, 2013, 12 pages.
Foreign Communication From a Counterpart Application, Chinese Application No. 201580083228.4, Chinese Office Action dated May 7, 2019, 13 pages.

* cited by examiner

TERMINAL DEVICE AND INCOMING CALL PROCESSING METHOD

CROSS-REFERENCE TO RELATED APPLICATIONS

This application is a U.S. National Stage of International Patent Application No. PCT/CN2015/090738 filed on Sep. 25, 2015, which is hereby incorporated by reference in its entirety.

TECHNICAL FIELD

Embodiments of the present disclosure relate to the communications field, and more in particular, to a terminal device and an incoming call processing method.

BACKGROUND

In other approaches, when there is an incoming call, a mobile phone enters an incoming call interface. The incoming call interface includes an incoming call number, an answer icon is used to answer the incoming call, and a rejection icon is used to reject the incoming call. The mobile phone may detect a pressing operation of a user on the answer icon or the rejection icon, and determine, according to the pressing operation of the user, whether to connect the incoming call or hang up the incoming call. In addition, if the user wants to perform a further operation on the incoming call on the basis of answering the incoming call or rejecting the incoming call, for example, the user rejects the incoming call and wants to blacklist the incoming call number, the user first needs to check historical call records, finds the incoming call number in the historical call records, and then chooses to blacklist the incoming call number. The operations are relatively complex.

SUMMARY

Embodiments of the present disclosure provide a terminal device and an incoming call processing method in order to reduce user operations.

According to a first aspect, an embodiment of the present disclosure provides a terminal device, where the terminal device includes a touch display screen, a pressure sensor, and a processor, where the touch display screen is configured to display an incoming call interface when the terminal device receives an incoming call, where the incoming call interface includes an incoming call number and a rejection icon, the pressure sensor is configured to determine a value of first pressure generated by the first touch operation when the terminal device detects a first touch operation on the rejection icon, and the processor is configured to reject the incoming call and initiate a first additional operation when the value of the first pressure that is determined by the pressure sensor exceeds a first threshold.

In a first possible implementation manner, the incoming call interface further includes an answer icon, the pressure sensor is further configured to determine a value of second pressure generated by the second touch operation when the terminal device detects a second touch operation on the answer icon, and the processor is further configured to answer the incoming call and initiate a second additional operation when the value of the second pressure that is determined by the pressure sensor exceeds a second threshold.

With reference to the foregoing possible implementation manner, in a second possible implementation manner, when rejecting the incoming call and initiating a first additional operation, the processor is configured to reject the incoming call when the value of the first pressure that is determined by the pressure sensor exceeds the first threshold and blacklist the incoming call number.

With reference to the foregoing possible implementation manners, in a third possible implementation manner, when rejecting the incoming call and initiating a first additional operation, the processor is configured to reject the incoming call when the value of the first pressure that is determined by the pressure sensor exceeds the first threshold and set a reminder event.

With reference to the foregoing possible implementation manners, in a fourth possible implementation manner, when rejecting the incoming call and initiating a first additional operation, the processor is configured to reject the incoming call when the value of the first pressure that is determined by the pressure sensor exceeds the first threshold and send a default short message service (SMS) message to the incoming call number.

With reference to the foregoing possible implementation manner, in a fifth possible implementation manner, when answering the incoming call and initiating a second additional operation, the processor is further configured to answer the incoming call when the value of the second pressure that is determined by the pressure sensor exceeds the second threshold and enable a handsfree function.

With reference to the foregoing possible implementation manners, in a sixth possible implementation manner, when answering the incoming call and initiating a second additional operation, the processor is further configured to answer the incoming call when the value of the second pressure that is determined by the pressure sensor exceeds the second threshold and enable recording.

According to a second aspect, another terminal device is provided, where the terminal device includes a touch display screen, a processor, and a pressure sensor, where the touch display screen is configured to display an incoming call interface when the terminal device receives an incoming call, where the incoming call interface includes an answer icon, the pressure sensor is configured to determine a value of pressure generated by the second touch operation when the terminal device detects a second touch operation on the answer icon, and the processor is configured to answer the incoming call and initiate a second additional operation when the value of the pressure that is determined by the pressure sensor exceeds a second threshold.

In a first possible implementation manner, when answering the incoming call and initiating a second additional operation, the processor is configured to answer the incoming call when the value of the pressure that is determined by the pressure sensor exceeds the second threshold and enable a handsfree function.

With reference to the foregoing possible implementation manner, in a second possible implementation manner, when answering the incoming call and initiating a second additional operation, the processor is configured to answer the incoming call when the value of the pressure that is determined by the pressure sensor exceeds the second threshold and enable recording.

According to a third aspect, an incoming call processing method is provided, including displaying an incoming call interface when an incoming call is received, where the incoming call interface includes an incoming call number and a rejection icon, and rejecting the incoming call and initiating a first additional operation when a first touch operation on the rejection icon is detected, and a value of first pressure generated by the first touch operation exceeds a first threshold.

In a first possible implementation manner, the incoming call interface further includes an answer icon, and the method further includes, when a second touch operation on the answer icon is detected, and a value of second pressure generated by the second touch operation exceeds a second threshold, answering the incoming call and initiating a second additional operation.

With reference to the foregoing possible implementation manner, in a second possible implementation manner, rejecting the incoming call and initiating a first additional operation includes rejecting the incoming call and blacklisting the incoming call number.

With reference to the foregoing possible implementation manners, in a third possible implementation manner, rejecting the incoming call and initiating a first additional operation includes rejecting the incoming call and setting a reminder event.

With reference to the foregoing possible implementation manners, in a fourth possible implementation manner, rejecting the incoming call and initiating a first additional operation includes rejecting the incoming call and sending a default SMS message to the incoming call number.

With reference to the foregoing possible implementation manner, in a fifth possible implementation manner, answering the incoming call and initiating a second additional operation includes answering the incoming call and enabling a speaker.

With reference to the foregoing possible implementation manner, in a sixth possible implementation manner, answering the incoming call and initiating a second additional operation includes answering the incoming call and enabling recording.

According to a fourth aspect, another incoming call processing method is provided, including displaying an incoming call interface when an incoming call is received, where the incoming call interface includes an answer icon, and answering the incoming call and initiating a second additional operation when a second touch operation on the answer icon is detected, and a value of pressure generated by the second touch operation exceeds a second threshold.

In a first possible implementation manner, answering the incoming call and initiating a second additional operation includes answering the incoming call and enabling a speaker.

With reference to the foregoing possible implementation manner, in a second possible implementation manner, answering the incoming call and initiating a second additional operation includes answering the incoming call and enabling recording.

Based on the foregoing technical solutions, the terminal device provided in the embodiments of the present disclosure includes the touch display screen, the pressure sensor, and the processor. When the touch display screen displays an incoming call interface, and the terminal device detects a first touch operation on a rejection icon in the incoming call interface, the pressure sensor determines a value of first pressure generated by the first touch operation. When the value of the first pressure that is determined by the pressure sensor exceeds a first threshold, the processor hangs up the call and initiates a first additional operation. In this way, user operations can be reduced.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
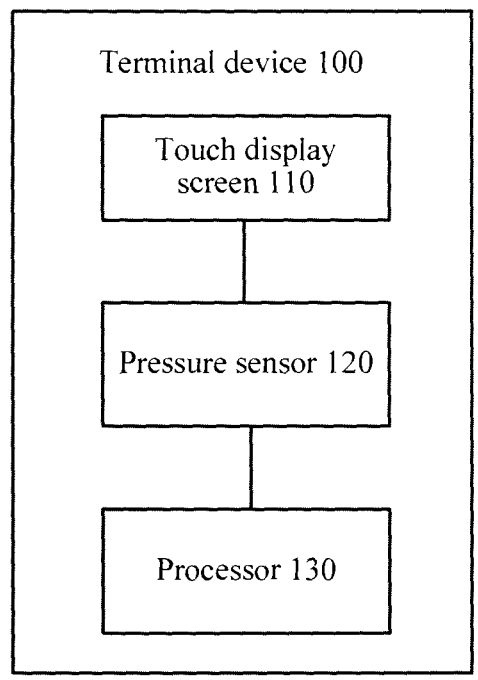
FIG. 1 is a schematic block diagram of a terminal device according to an embodiment of the present disclosure.

FIG. 1 is a schematic block diagram of a terminal device 100 according to an embodiment of the present disclosure. The terminal device 100 may include a touch display screen 110, a pressure sensor 120, and a processor 130.

Figure 2:
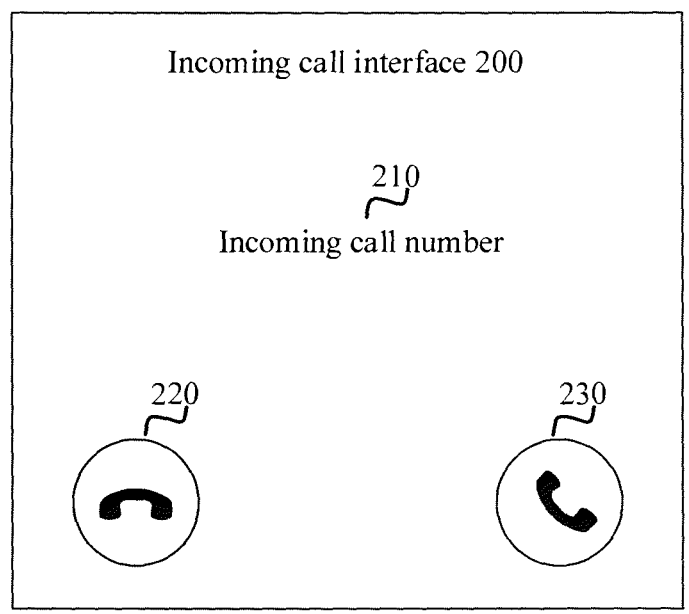
FIG. 2 is a schematic diagram of an incoming call interface displayed by a touch display screen of a terminal device.

The touch display screen 110 is configured to, when the terminal device 100 receives an incoming call, display an incoming call interface 200 (see FIG. 2). The incoming call interface 200 includes an incoming call number 210 and a rejection icon 220.

The incoming call interface 200 may further include another icon, for example, an answer icon 230 or an SMS message icon. Moreover, the rejection icon 220 may also be referred to as a rejection button, a rejection widget, or another name. The answer icon 230 may also be referred to as an answer button, an answer widget, or another name. The names should not constitute any limitation to the present disclosure.

In an optional embodiment, the touch display screen 110 may be configured to, when the terminal device 100 receives an incoming call, display the incoming call interface 200. The incoming call interface 200 may include an incoming call number 210, an answer icon 230, and a rejection icon 220. Moreover, the incoming call interface 200 may further include another icon. This is not limited in this embodiment of the present disclosure.

The pressure sensor 120 is configured to, when the terminal device 100 detects a first touch operation on the rejection icon 220, determine a value of first pressure generated by the first touch operation.

That the pressure sensor 120 is configured to, when the terminal device 100 detects a first touch operation on the rejection icon 220, determine a value of first pressure generated by the first touch operation may include, when a touch sensor detects the first touch operation on the rejection icon 220, determine the value of the first pressure generated by the first touch operation.

The touch sensor may be a part of the touch display screen 110.

The first touch operation on the rejection icon 220 that is detected by the terminal device 100 may be used to represent that a user wants to reject the incoming call. The first touch operation may have different specific touch operations according to different implementation manners of an electronic device. For example, the first touch operation of the user on the rejection icon 220 may include pressing the rejection icon 220, sliding the rejection icon 220, sliding to the rejection icon 220, making a particular gesture on the rejection icon 220, and the like. This is not limited in this embodiment of the present disclosure. Moreover, the first touch operation on the rejection icon 220 that is detected by the terminal device 100 may be a touch operation detected in a sensing area of the rejection icon 220. This is not limited in this embodiment of the present disclosure.

The pressure sensor 120 may sense the value of the first pressure generated by the first touch operation. The value of the first pressure may be a relative value or an absolute value. For example, the value of the first pressure may be a change of pressure generated by the first touch operation, or the value of the first pressure may be a value used to represent a pressure degree. For example, the value of the first pressure being 1 represents low pressure, and the value of the first pressure being 2 represents high pressure. However, this embodiment of the present disclosure is not limited thereto.

The processor 130 is configured to, when the value of the first pressure that is determined by the pressure sensor 120 exceeds a first threshold, reject the incoming call and initiate a first additional operation.

The pressure sensor 120 may send the value of the first pressure to the processor 130. Correspondingly, after receiving the value of the first pressure that is sent by the pressure sensor 120, the processor 130 may compare the value of the first pressure with the first threshold, and reject the incoming call and initiate the first additional operation when the value of the first pressure exceeds the first threshold. The first threshold may be a specific pressure value, or may be a value used to represent a pressure degree. The first threshold may be preset. For example, the first threshold may be predefined and preconfigured in a storage unit, or the first threshold may be preset by the user. This is not limited in this embodiment of the present disclosure.

Optionally, the processor 130 may reject the incoming call and initiate the first additional operation when the value of the first pressure exceeds the first threshold, or the processor 130 may set a fourth threshold, and reject the incoming call and initiate the first additional operation when the value of the first pressure exceeds the first threshold and is less than the fourth threshold. This is not limited in this embodiment of the present disclosure.

Therefore, the terminal device 100 according to this embodiment of the present disclosure includes the touch display screen 110, the pressure sensor 120, and the processor 130. When the touch display screen 110 displays an incoming call interface 200, and the terminal device 100 detects a first touch operation on a rejection icon 220 in the incoming call interface 200, the pressure sensor 120 determines a value of first pressure generated by the first touch operation. When the value of the first pressure that is determined by the pressure sensor 120 exceeds a first threshold, the processor 130 hangs up the call and initiates a first additional operation. In this way, user operations can be reduced. Further, user experience can be improved.

The terminal device 100 may be any device having a call function, for example, a mobile phone, a tablet personal computer, a media player, a smart television, a laptop computer, a personal digital assistant (PDA), a personal computer, a mobile Internet device (MID), or a wearable device such as a smart watch. This is not limited in this embodiment of the present disclosure.

In this embodiment of the present disclosure, the terminal device 100 may include various types of sensing components, for example, a gravity sensor, a tri-axis accelerometer, a gyroscope, and a Hall component. The Hall component may be configured to detect a physical quantity of the terminal device 100, for example, a force, a torque, pressure, stress, a location, displacement, a speed, an acceleration, an angle, an angular velocity, a revolution, and a time at which a working state changes, and convert the physical quantity into a quantity of electricity for detection and control. In an optional embodiment, the terminal device 100 includes one or more touch sensors and one or more pressure sensors 120. Optionally, the touch sensor and the pressure sensor 120 may be integrated into one component, or the touch sensor and the pressure sensor 120 may be respectively implemented by different components. This is not limited in this embodiment of the present disclosure.

The touch sensor may also be referred to as a touch panel, and may be configured to detect a touch operation of a user on the touch display screen 110 or detect a touch operation performed by a user on a location near the touch display screen 110, and drive, according to a preset program, a corresponding component connected to the touch sensor. The touch operation may include an operation such as tapping, sliding, or sliding to, or making a particular gesture, for example, a touch operation performed by the user on the touch display screen 110 or a touch operation performed by the user on a location near the touch display screen 110 using any suitable object or accessory such as a finger or a stylus. Optionally, the touch sensor may include two parts, a touch detection component and a touch controller. The touch detection component is configured to detect a touch operation on the touch display screen 110 or a touch operation performed on a location near the touch display screen 110, convert the detected operation into an electrical signal, and transfer the electrical signal to the touch controller. The touch controller may receive the electrical signal from the touch detection component, convert the electrical signal into touch point coordinates, and then send the touch point coordinates to the processor 130. Optionally, the touch controller may be further configured to receive and execute a command sent by the processor 130. This embodiment of the present disclosure is not limited thereto.

In an optional embodiment, the touch sensor may be configured to detect a touch operation on or near the touch display screen 110, and covert the detected touch operation into an electrical signal (that is, a touch signal). The touch signal may include touch point information (for example, a location of a touch point or a changing track of a touch point) of the touch operation. Subsequently, the touch sensor may send the touch signal to the processor 130. After receiving the touch signal, the processor 130 may process the touch signal to determine and trigger corresponding processing on the touch signal. For example, the touch sensor detects the first touch operation on the rejection icon 220 in the incoming call interface 200, determines a first touch signal corresponding to the first touch operation, and sends the first touch signal to the processor 130. Correspondingly, after receiving the first touch signal sent by the touch sensor, the processor 130 may determine, according to the first touch signal, that the first touch operation is used to instruct to reject the incoming call, and initiate processing of rejecting the incoming call to hang up the call. However, this embodiment of the present disclosure is not limited thereto.

In this embodiment of the present disclosure, the touch sensor may be a part of the touch display screen 110, that is, the touch display screen 110 further includes the touch sensor.

In this embodiment of the present disclosure, the pressure sensor 120 may be a resistive, capacitive, or inductive pressure sensor, or the like, and the pressure sensor 120 may be deployed at one or more locations of the terminal device 100, for example, deployed below or around the touch display screen 110, and may be configured to detect pressure on at least one location on an outer surface of the terminal device 100. For example, when a user performs a touch operation such as tapping, sliding, or making a particular gesture on an icon on the touch display screen 110, the pressure sensor 120 may sense a change of a circuit parameter such as resistance, capacitance, or inductance that is caused by the touch operation of the user. Optionally, the pressure sensor 120 may send related information about the change of the circuit parameter to the processor 130. The processor 130 may determine a value of pressure according to the related information about the change of the circuit parameter. In another optional embodiment, the pressure sensor 120 may include a pressure detection component and a pressure controller. The pressure detection component is configured to sense a change of a circuit parameter that is caused by a touch operation of a user. The pressure controller may be configured to determine a value of pressure according to the change of the circuit parameter that is detected by the pressure detection component, and send the determined value of the pressure to the processor 130. However, this embodiment of the present disclosure is not limited thereto.

The processor 130 may compare the value of the first pressure with a preset condition. If the value of the first pressure satisfies the preset condition (for example, exceeds the first threshold), the processor 130 may reject the incoming call and initiate the first additional operation. The processor 130 may execute processing of rejecting the incoming call and simultaneously initiate the first additional operation, or may execute processing of rejecting the incoming call and initiate the first additional operation in any sequence. This is not limited in this embodiment of the present disclosure.

It should be understood that in this embodiment of the present disclosure, in "when the value of the first pressure exceeds the first threshold, the processor 130 rejects the incoming call and initiates the first additional operation," whether the value of the first pressure exceeds the first threshold may be a determining condition of whether the processor 130 initiates the first additional operation on the basis of rejecting the incoming call. Certainly, whether the value of the first pressure exceeds the first threshold may also be a determining condition of whether the processor 130 rejects the incoming call and initiates the first additional operation.

Optionally, if the value of the first pressure does not exceed the first threshold, the processor 130 neither performs processing of rejecting the incoming call nor initiates the first additional operation, and if the value of the first pressure does not exceed the first threshold, the processor 130 may only reject the incoming call but does not initiate the first additional operation. That "when the value of the first pressure exceeds the first threshold, the processor 130 rejects the incoming call and initiates the first additional operation" may be used to represent that whether the value of the first pressure exceeds the first threshold is a determining condition of whether the processor 130 initiates the first additional operation on the basis of rejecting the incoming call. That is, in this embodiment of the present disclosure, whether the processor 130 performs processing of rejecting the incoming call may depend only on whether the touch sensor detects a touch operation on the rejection icon 220. For example, if the terminal device 100 detects the first touch operation on the rejection icon 220, and a value of pressure generated by the first touch operation is less than the first threshold (for example, the user touches the rejection icon 220 lightly), the processor 130 may only reject the incoming call (that is, hang up the incoming call) but does not initiate the first additional operation, or if the terminal device 100 detects the first touch operation on the rejection icon 220 and a value of pressure generated by the first touch operation exceeds the first threshold (for example, the user presses the rejection icon 220 heavily), the processor 130 may initiate the first additional operation on the basis of rejecting the incoming call, for example, blacklist the incoming call number 210. However, this is not limited in this embodiment of the present disclosure.

In an optional embodiment, the terminal device 100 may further include a memory (not shown), which may be configured to store a software program or module. In this case, the processor 130 may run or execute the software program and/or module stored in the memory, and invoke data stored in the memory to implement various functions of the terminal device and/or process data. Optionally, the processor 130 may include an integrated circuit (IC) (not shown), for example, may include a single packaged IC, or may include multiple successive packaged ICs that have same functions or different functions. The processor 130 may be a central processing unit (CPU), or the processor 130 may be another general purpose processor, a digital signal processor (DSP), an application-specific integrated circuit (ASIC), a field programmable gate array (FPGA), or another programmable logic device, discrete gate or transistor logic device, discrete hardware component, or the like. A general purpose processor may be a microprocessor or the processor 130 may be any conventional processor or the like. This is not limited in this embodiment of the present disclosure.

In this embodiment of the present disclosure, the processor 130 may initiate one or more first additional operations on the basis of rejecting the call. In an optional embodiment, that the processor 130 rejects the incoming call and initiates a first additional operation includes the processor 130 rejects the incoming call and blacklists the incoming call number 210.

In another optional embodiment, that the processor 130 rejects the incoming call and initiates a first additional operation includes the processor 130 rejects the incoming call and sets a reminder event.

The reminder event may be used to remind the user to call the incoming call number 210 back or return an SMS message to the incoming call number 210. The SMS message may be a default SMS message or an SMS message edited by the user. For example, the processor 130 may set an alarm or a timed memo. An interval between a time corresponding to the alarm or the memo and a time of the incoming call may be a preset value. When the time corresponding to the alarm or the memo arrives, the user is reminded to call the incoming call number 210 back or return an SMS message to the incoming call number 210. This embodiment of the present disclosure is not limited thereto.

In another optional embodiment, that the processor 130 rejects the incoming call and initiates a first additional operation includes the processor 130 rejects the incoming call and sends a default SMS message to the incoming call number 210.

The processor 130 may directly send a preset default SMS message to the incoming call number 210. The preset default SMS message may be preset by a device manufacturer or a network provider, or may be preset by the user. Alternatively, the processor 130 may control the touch display screen 110 to display a default SMS message selection interface. The default SMS message selection interface may include multiple default SMS message options. In this way, the user may select, from default SMS messages corresponding to the multiple default SMS message options, a default SMS message to be sent to the incoming call number. When detecting a touch operation (for example, a tapping operation) on a target default SMS message option in the multiple default SMS message options, the processor 130 may send a target default SMS message to the incoming call number. However, this embodiment of the present disclosure is not limited thereto.

In another optional embodiment, that the processor 130 rejects the incoming call and initiates a first additional operation includes the processor 130 rejects the incoming call and opens an SMS message edit box. The SMS message edit box may be used to send an SMS message to the incoming call number. However, this embodiment of the present disclosure is not limited thereto.

Optionally, the processor 130 may initiate any additional operation combination of blacklisting the incoming call number, setting the reminder event, sending the default SMS message, and opening the SMS message edit box on the basis of rejecting the call, or the processor 130 may initiate another type of first additional operation on the basis of rejecting the call. This embodiment of the present disclosure is not limited thereto.

In another optional embodiment, when the value of the first pressure exceeds the first threshold, the processor may display an additional operation selection box. The additional operation selection box includes multiple additional operation options, for the user to select, from the multiple additional operation options, an additional operation that the user wants to execute. When the terminal device 100 detects a touch operation on a target additional operation option in the multiple additional operation options (the touch operation may be used to represent that the user selects the target additional operation option), the processor 130 may initiate an additional operation corresponding to the target additional operation option, that is, the additional operation corresponding to the target additional operation option is the first additional operation. However, this embodiment of the present disclosure is not limited thereto.

In another optional embodiment, the incoming call interface 200 further includes an answer icon 230. The pressure sensor 120 is further configured to, when the terminal device 100 detects a second touch operation on the answer icon 230, determine a value of second pressure generated by the second touch operation. Correspondingly, the processor 130 is further configured to, when the value of the second pressure that is determined by the pressure sensor 120 exceeds a second threshold, answer an incoming call and initiate a second additional operation.

The second touch operation on the answer icon 230 that is detected by the terminal device 100 may be used to represent that a user wants to answer the incoming call. The second touch operation may have different specific touch operations according to different implementation manners of an electronic device. For example, the second touch operation of the user on the answer icon 230 may include pressing the answer icon 230, sliding the answer icon 230, sliding to the answer icon 230, making a particular gesture on the answer icon 230, and the like. This is not limited in this embodiment of the present disclosure. Moreover, the second touch operation on the answer icon 230 that is detected by the terminal device 100 may be a touch operation detected in a sensing area of the answer icon 230. This is not limited in this embodiment of the present disclosure.

Optionally, the touch sensor may detect the second touch operation on the answer icon, determine a second touch signal corresponding to the second touch operation, and send the second touch signal to the processor 130. Correspondingly, after receiving the second touch signal sent by the touch sensor, the processor 130 may determine, according to the second touch signal, that the second touch operation is used to instruct to answer the incoming call, and initiate process of answering the incoming call to connect the incoming call. However, this embodiment of the present disclosure is not limited thereto.

The pressure sensor 120 may sense the value of the second pressure generated by the second touch operation. The value of the second pressure may be a relative value or an absolute value. For example, the value of the second pressure may include a change of pressure generated by the second touch operation, or the value of the second pressure may be a value used to represent a pressure degree. For example, the value of the second pressure being 1 represents low pressure, and the value of the second pressure being 2 represents high pressure. However, this embodiment of the present disclosure is not limited thereto.

The pressure sensor 120 may send the value of the second pressure to the processor 130. Correspondingly, after receiving the value of the second pressure that is sent by the pressure sensor 120, the processor 130 may compare the value of the second pressure with the second threshold, and answer the incoming call (that is, connect the incoming call) and initiate the second additional operation when the value of the second pressure exceeds the second threshold. Optionally, the processor 130 may answer the incoming call and initiate the second additional operation when the value of the second pressure exceeds the second threshold, or the processor 130 may set a fifth threshold, and answer the incoming call and initiate the second additional operation when the value of the second pressure exceeds the second threshold and is less than the fifth threshold. This is not limited in this embodiment of the present disclosure.

The second threshold may be a specific pressure value, or may be a value used to represent a pressure degree. The second threshold may be pre-specified or preset by the user. The first threshold may be equal to or not equal to the second threshold. In addition, a specific operation corresponding to the first additional operation and/or a specific operation corresponding to the second additional operation may be predefined, and set in a default configuration of the terminal device, or may be preset by the user. This is not limited in this embodiment of the present disclosure.

It should be understood that in this embodiment of the present disclosure, in "when the value of the second pressure exceeds the second threshold, the processor 130 answers the incoming call and initiates the second additional operation," whether the value of the second pressure exceeds the second threshold may be a determining condition of whether the processor 130 initiates the second additional operation on the basis of answering the incoming call. Certainly, whether the value of the second pressure exceeds the second threshold may also be a determining condition of whether the processor 130 answers the incoming call and initiates the second additional operation. This is not limited in this embodiment of the present disclosure.

Optionally, if the value of the second pressure does not exceed the second threshold, the processor 130 neither performs processing of answering the incoming call nor initiates the second additional operation, and if the value of the second pressure does not exceed the second threshold, the processor 130 may only answer the incoming call but does not initiate the second additional operation. Optionally, that "when the value of the second pressure exceeds the second threshold, the processor 130 answers the incoming call and initiates the second additional operation represents that whether the value of the second pressure exceeds the second threshold is a determining condition of whether the processor 130 initiates the second additional operation on the basis of answering the incoming call. That is, in this embodiment of the present disclosure, whether the processor 130 performs process of answering the incoming call may depend only on whether the touch sensor detects a particular touch operation on the answer icon 230. For example, if the terminal device 100 detects the second touch operation on the answer icon 230, and a value of pressure generated by the second touch operation is less than the second threshold (for example, the user touches the answer icon 230 lightly), the processor 130 may only answer the incoming call (that is, connect the incoming call) but does not initiate the second additional operation, or if the terminal device 100 detects the second touch operation on the answer icon 230 and a value of pressure generated by the second touch operation exceeds the second threshold (for example, the user presses the answer icon heavily), the processor 130 may initiate the second additional operation on the basis of answering the incoming call, for example, enable a handsfree function. However, this is not limited in this embodiment of the present disclosure.

Optionally, that the processor 130 answers the incoming call and initiates a second additional operation includes the processor 130 answers the incoming call and enables a speaker.

Optionally, in another embodiment, that the processor 130 answers the incoming call and initiates a second additional operation includes the processor 130 answers the incoming call and enables recording.

The processor 130 may initiate one or more second additional operations. For example, the processor 130 may enable the handsfree function and enable recording on the basis of answering the incoming call, or the processor 130 may initiate another type of second additional operation on the basis of answering the incoming call. This embodiment of the present disclosure is not limited thereto.

In another optional embodiment, the incoming call interface 200 may further include an SMS message icon (not shown). The pressure sensor 120 is further configured to, when the terminal device 100 detects a third touch operation on the SMS message icon, determine a value of third pressure generated by the third touch operation. Correspondingly, the processor 130 is further configured to, when the value of the third pressure that is determined by the pressure sensor 120 exceeds a third threshold, reject the incoming call and open an SMS message edit box, or reject the incoming call and send a default SMS message to the incoming call number 210. The SMS message edit box may be used by the user to edit an SMS message. Then, the processor 130 sends the SMS message edited by the user to the incoming call number 210. The processor 130 may directly send a preset default SMS message to the incoming call number 210, or the processor 130 may control the touch display screen 110 to display a default SMS message selection interface and send a default SMS message selected by the user to the incoming call number 210. This is not limited in this embodiment of the present disclosure.

In another optional embodiment, the touch display screen 110 is further configured to display an SMS message interface (not shown). The SMS message interface may include information and a deletion icon that are of a target SMS message. The pressure sensor 120 is further configured to, when the terminal device 100 detects a fourth touch operation on the deletion icon, determine a value of fourth pressure generated by the fourth touch operation. The processor 130 is further configured to, when the value of the fourth pressure exceeds a sixth threshold, delete the target SMS message and blacklist a phone number corresponding to the target SMS message.

The SMS message interface may be an SMS message list interface. In this case, the target SMS message may be an SMS message selected by the user and included in a historical SMS message list or a historical SMS message list corresponding to a contact selected by the user, or the SMS message interface may be further an SMS message display interface used to display content of the target SMS message. However, this embodiment of the present disclosure is not limited thereto. The information about the target SMS message may include a phone number corresponding to the target SMS message and/or a contact name corresponding to the target SMS message, and may further include the content of the target SMS message, and the like. This is not limited in this embodiment of the present disclosure.

When the value of the fourth pressure exceeds the sixth threshold, the pressure sensor may blacklist, on the basis of deleting the target SMS message, the phone number corresponding to the target SMS message in order to prevent the user from performing touch operations multiple times to separately delete the target SMS message and blacklist the phone number, thereby further improving user experience.

In another optional embodiment, the touch display screen 110 is further configured to display a historical call interface. The historical call interface may include information and a deletion icon that are of a target call record. The pressure sensor 120 is further configured to, when the terminal device 100 detects a fifth touch operation on the deletion icon, determine a value of fifth pressure generated by the fifth touch operation. The processor 130 is further configured to, when the value of the fifth pressure exceeds a seventh threshold, delete the target call record and blacklist a phone number corresponding to the target call record.

The historical call interface may include multiple historical call records, and may further include at least one operation option. The target call record may be selected by the user, and the at least one operation option may pop up when the terminal device 100 detects a touch operation on the target call record in the historical call records. However, this embodiment of the present disclosure is not limited thereto. The information about the target call record may include the phone number corresponding to the target call record and/or a contact name corresponding to the target call record, and the like. This is not limited in this embodiment of the present disclosure.

When the value of the fifth pressure exceeds the seventh threshold, the pressure sensor may blacklist, on the basis of deleting the target call record, the phone number corresponding to the target call record in order to prevent the user from performing touch operations multiple times to separately delete the target call record and blacklist the phone number, thereby further improving user experience.

In this embodiment of the present disclosure, the touch sensor is configured to, when the touch display screen 110 displays the incoming call interface 200, detect a touch operation on the touch display screen 110. The pressure sensor 120 is configured to determine a value of pressure generated by the touch operation. The processor 130 is configured to perform first processing according to the touch operation detected by the touch sensor, where the first processing is processing of answering the incoming call or processing of rejecting the incoming call, and when the value of the pressure that is determined by the pressure sensor 120 satisfies a preset condition (for example, exceeds a threshold), perform additional processing. In this way, the terminal device 100 may initiate the additional processing according to the touch operation of the user on the basis of initiating the first processing. The processor 130 may simultaneously initiate the first processing and the additional processing, or may initiate the first processing and the additional processing in any sequence. For example, the processor 130 may first hang up the incoming call, and then blacklist the incoming call number. However, this embodiment of the present disclosure is not limited thereto.

In an optional embodiment, if the touch operation includes a touch operation on the answer icon 230, the additional processing may include at least one of the following processing of enabling a speaker or enabling a recorder.

In another optional embodiment, if the touch operation includes a touch operation on the rejection icon, the additional processing may include at least one of the following processing of blacklisting the incoming call number 210, returning a default SMS message to the incoming call number 210, opening an SMS message edit box, or setting a reminder event used to remind the user to call the incoming call number 210 back or return an SMS message to the incoming call number 210.

Optionally, in this embodiment of the present disclosure, whether to initiate additional processing may be determined by combining a value of pressure and other information, and/or when additional processing needs to be initiated, which kind of additional processing to be initiated is determined. The other information may include current status information of the terminal device 100, for example, the terminal device 100 is currently in a conference mode or an airplane mode, or may include information about the incoming call or context information. This embodiment of the present disclosure is not limited thereto. Optionally, when detecting a touch operation on the answer icon 230 or the rejection icon 220, the terminal device 100 may determine, according to a value of pressure generated by the touch operation and a current mode of the terminal device 100, whether to initiate additional processing. For example, if the terminal device 100 is currently in a conference mode, even if the terminal device 100 determines that the value of the pressure generated by the touch operation on the answer icon 230 exceeds a threshold, the terminal device 100 does not initiate additional processing (for example, enabling the speaker) to prevent a misoperation caused by unintentional re-pressing when the user presses the answer icon 230. In another optional embodiment, when performing a touch operation on the answer icon 230 or the rejection icon 220, the terminal device 100 may determine, according to a value of pressure generated by the touch operation and related information about the incoming call, whether to initiate additional processing. For example, if the terminal device 100 determines that the incoming call number is an unknown number, and is a "fraud" number, the terminal device 100 detects a touch operation of the user on the rejection icon 220, and determines to initiate additional processing (for example, blacklisting the incoming call number) even if a value of pressure generated by the touch operation does not exceed a threshold. In this way, a misoperation caused by accidental touch of the user can be prevented, thereby further improving user experience.

Therefore, when the terminal device 100 receives the incoming call, the touch display screen 110 displays the incoming call interface 200. When the touch display screen 110 displays the incoming call interface 200, the touch sensor may detect a touch operation of the user on the answer icon 230 or the rejection icon 220 on the touch display screen 110. The pressure sensor 120 may detect a change of a parameter (resistance, capacitance, inductance, or the like) that is caused when the terminal device 100 is deformed due to the touch operation. The processor 130 may determine first processing (that is, processing of answering the incoming call or processing of rejecting the incoming call) corresponding to the touch operation, determine whether a value of pressure generated by the touch operation satisfies a preset condition, and when the value of the pressure satisfies the preset condition, initiate additional processing based on the first processing. In this way, the terminal device 100 may perform, on the basis of performing the process of answering the incoming call or rejecting the incoming call, the additional processing according to the touch operation of the user on the answer icon 230 or the rejection icon 220 in the incoming call interface 200. The user does not need to perform operations multiple times, thereby further improving user experience.

In this embodiment of the present disclosure, the touch operation may also include a pressing operation of the user on the rejection icon 220 or the answer icon 230 in the incoming call interface 200, and in this case, the touch operation may correspond to one touch point, or the touch operation may be a slide operation or a sliding-to operation of the user on the rejection icon 220 or the answer icon 230 in the incoming call interface 200, and in this case, the touch operation may correspond to multiple touch points. The value of the pressure that is determined by the pressure sensor 120 may be a value of pressure detected by the pressure sensor 120 on one or more touch points. The value of the pressure may be a relative value of the pressure or an absolute value of the pressure, or a value representing a pressure degree. In addition, the value of the pressure generated by the touch operation may be an average value of the pressure, a maximum value of the pressure, a minimum value of the pressure generated by the touch operation, a pressure value in specific duration or at a moment, or the like. This is not limited in this embodiment of the present disclosure.

In an optional embodiment, the processor 130 is further configured to, if a value of transitory pressure generated by the touch operation exceeds an eighth threshold in first continuous duration, perform additional processing, where the first continuous duration exceeds a duration threshold, or the processor 130 may determine duration of the touch operation, and perform additional processing when the duration of the touch operation exceeds a duration threshold and the value of the pressure generated by the touch operation exceeds an eighth threshold.

In another optional embodiment, different additional processing may correspond to different eighth thresholds. In this case, the memory may store correspondences between multiple preset pressure conditions and multiple preset additional processing. Each preset pressure condition may correspond to one or more preset additional processing. In this case, the processor 130 may determine, from the multiple preset pressure conditions, a target preset pressure condition that the value of the pressure detected by the pressure sensor 120 satisfies, and initiate at least one preset additional processing corresponding to the target preset pressure condition. For example, a first preset pressure condition corresponds to enabling a speaker, a second preset pressure condition corresponds to enabling a recorder, and the like. In this case, if the processor 130 determines that the value of the sensed pressure satisfies the first preset pressure condition, the processor 130 may enable the handsfree function on the basis of answering the incoming call. However, this embodiment of the present disclosure is not limited thereto.

In another optional embodiment, if the value of the pressure that is determined by the pressure sensor 120 exceeds the eighth threshold, the processor 130 may determine that additional processing corresponding to the first processing needs to be initiated. In this case, the processor 130 may determine, by comparing to determine whether the value of the pressure generated by the touch operation exceeds the eighth threshold, whether to initiate one or more additional processing corresponding to the first processing. However, this embodiment of the present disclosure is not limited thereto.

Figure 4:
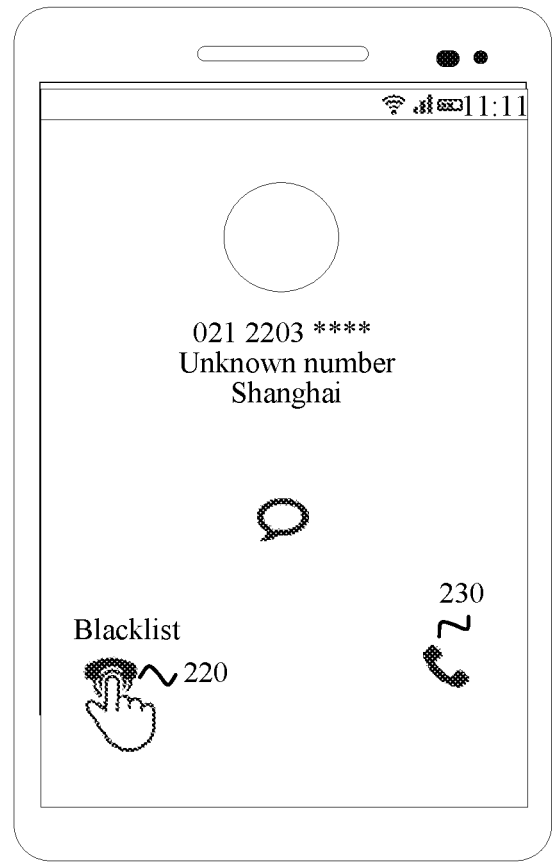
FIG. 4 is an example of a schematic diagram of a display interface when a user presses a rejection icon heavily according to an embodiment of the present disclosure.
Figure 5:
FIG. 5 is an example of a schematic diagram of a display interface when a user presses an answer icon heavily according to an embodiment of the present disclosure.

In another optional embodiment, after the processor 130 initiates the first processing and the additional processing, the terminal device 100 may further output a prompt of initiating the additional processing or output a result of the additional processing. An output manner may be outputting in a form of a text or an icon on the touch display screen 110, outputting in a manner of voice or vibration, or the like. For example, as shown in FIG. 4, when the user presses the rejection icon 220 heavily, the processor 130 may determine to blacklist the incoming call number 210 on the basis of rejecting the call. In this case, the touch display screen 110 may display a prompt of "Blacklist" on the incoming call interface 200. For another example, as shown in FIG. 5, when the user presses the answer icon 230 heavily, the processor 130 may determine to enable the handsfree function on the basis of answering the call. In this case, the touch display screen 110 may display a prompt message of "Handsfree function is enabled" on the incoming call interface 200. This embodiment of the present disclosure is not limited thereto.

In the foregoing, when the value of the pressure generated by the first touch operation on the rejection icon 220 exceeds the first threshold, the processor 130 rejects the incoming call and initiates the first additional operation. Optionally, in this embodiment of the present disclosure, the processor 130 may also determine first duration of the first touch operation on the rejection icon 220, and when the first duration exceeds a preset threshold, reject the incoming call and initiate the first additional operation, or the processor 130 may determine first duration of the first touch operation, and determine, according to the first duration and the value of the first pressure, whether to initiate the first additional operation. However, this embodiment of the present disclosure is not limited thereto.

Optionally, in this embodiment of the present disclosure, the processor 130 may also determine, according to whether a value of pressure generated by a touch operation on an icon in a display interface exceeds a threshold, whether to perform additional processing on the basis of performing corresponding processing on the icon, the processor 130 may determine, according to whether duration of a touch operation on an icon in a display interface exceeds a threshold, whether to perform additional processing on the basis of performing corresponding processing on the icon, or the processor 130 may determine, with reference to the foregoing value of the pressure and the foregoing duration, whether to perform additional processing. This is not limited in this embodiment of the present disclosure.

Figure 3:
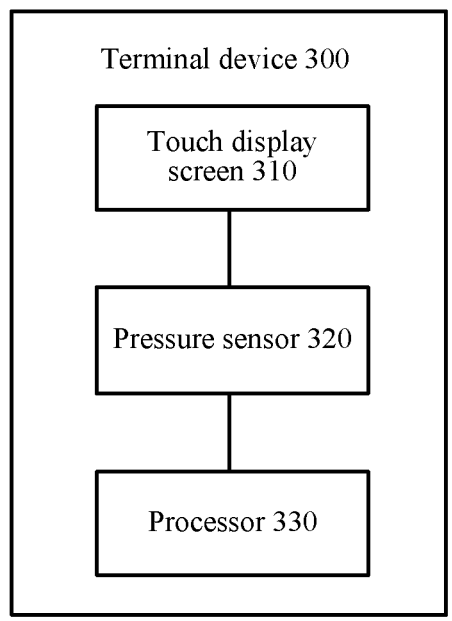
FIG. 3 is a schematic block diagram of a terminal device according to another embodiment of the present disclosure.

FIG. 3 is a schematic block diagram of another terminal device 300 according to an embodiment of the present disclosure. The terminal device 3000 includes a touch display screen 310, a processor 330, and a pressure sensor 320.

The touch display screen 310 is configured to, when the terminal device 300 receives an incoming call, display an incoming call interface 200 (see FIG. 2). The incoming call interface 200 includes an answer icon 230.

The pressure sensor 320 is configured to, when the terminal device 300 detects a second touch operation on the answer icon 230, determine a value of pressure generated by the second touch operation.

The processor 330 is configured to, when the value of the pressure that is determined by the pressure sensor 320 exceeds a second threshold, answer the incoming call and initiate a second additional operation.

In this way, when the terminal device detects a touch operation of a user on the answer icon in the incoming call interface 200, and a value of pressure generated by the touch operation exceeds the second threshold, the processor 330 may initiate process of answering the incoming call (that is, connecting the incoming call) and initiate the second additional operation such that user operations are reduced, thereby further improving user experience.

That the pressure sensor 320 is configured to, when the terminal device 300 detects a second touch operation on the answer icon 230, determine a value of pressure generated by the second touch operation may include that the pressure sensor 320 is configured to, when a touch sensor detects the second touch operation on the answer icon 230, determine the value of the pressure generated by the second touch operation.

Optionally, the touch sensor may be a part of the touch display screen.

In an optional embodiment, that the processor 330 answers the incoming call and initiates a second additional operation includes the processor 330 answers the incoming call and enables a speaker.

In an optional embodiment, that the processor 330 answers the incoming call and initiates a second additional operation includes the processor 330 answers the incoming call and enables recording.

The processor 330 may initiate one or more second additional operations on the basis of answering the incoming call. For example, the processor 330 may further enable the handsfree function and enable recording on the basis of answering the incoming call, or the processor 330 may initiate another type of second additional operation on the basis of answering the incoming call. This embodiment of the present disclosure is not limited thereto.

The second touch operation on the answer icon that is detected by the terminal device may be used to represent that a user wants to answer the incoming call. The second touch operation may have different specific touch operations according to different implementation manners of an electronic device. For example, the second touch operation of the user on the answer icon 230 may be pressing the answer icon 230, sliding the answer icon 230, sliding to the answer icon 230, making a particular gesture on the answer icon 230, and the like. This is not limited in this embodiment of the present disclosure. Moreover, the second touch operation on the answer icon 230 that is detected by the terminal device 300 may be a touch operation detected in a sensing area of the answer icon 230. This is not limited in this embodiment of the present disclosure.

Optionally, the terminal device 300 may include a touch sensor. The touch sensor may be a part of the touch display screen 310 or a component disposed independent of the touch display screen 310. The touch sensor may detect the second touch operation on the answer icon 230, determine a second touch signal corresponding to the second touch operation, and send the second touch signal to the processor 330. Correspondingly, after receiving the second touch signal sent by the touch sensor, the processor 330 may determine, according to the second touch signal, that the second touch operation is used to instruct to answer the incoming call, and initiate process of answering the incoming call to connect the incoming call. However, this embodiment of the present disclosure is not limited thereto.

The pressure sensor 320 may sense the value of the second pressure generated by the second touch operation. The value of the second pressure may be a relative value or an absolute value. For example, the value of the second pressure may be a change of pressure generated by the second touch operation, or the value of the second pressure may be a value used to represent a pressure degree. For example, the value of the second pressure being 1 represents low pressure, and the value of the second pressure being 2 represents high pressure. However, this embodiment of the present disclosure is not limited thereto.

The pressure sensor 320 may send the value of the second pressure to the processor 330. Correspondingly, after receiving the value of the second pressure that is sent by the pressure sensor 320, the processor 330 may compare the value of the second pressure with the second threshold, and answer the incoming call (that is, connect the incoming call) and initiate the second additional operation when the value of the second pressure exceeds the second threshold. Optionally, the processor 330 may answer the incoming call and initiate the second additional operation when the value of the second pressure exceeds the second threshold, or the processor 330 may set a fifth threshold, and answer the incoming call and initiate the second additional operation when the value of the second pressure exceeds the second threshold and is less than the fifth threshold. This is not limited in this embodiment of the present disclosure.

The second threshold may be a specific pressure value, or may be a value used to represent a pressure degree. The second threshold may be pre-specified or preset by the user. The first threshold may be equal to or not equal to the second threshold. In addition, a specific operation corresponding to the first additional operation and/or a specific operation corresponding to the second additional operation may be pre-specified, and set in a default configuration of the terminal device 300, or may be preset by the user. This is not limited in this embodiment of the present disclosure.

It should be understood that in this embodiment of the present disclosure, that "when the value of the second pressure exceeds the second threshold, the processor 330 answers the incoming call and initiates the second additional operation" may be used to represent that whether the value of the second pressure exceeds the second threshold is a determining condition of whether the processor 330 "not only answers the incoming call but also initiates the second additional operation, or is only used to represent a determining condition of whether the processor 330 "initiates the second additional operation." Optionally, if the value of the second pressure does not exceed the second threshold, the processor 330 neither performs processing of answering the incoming call nor initiates the second additional operation, and if the value of the second pressure does not exceed the second threshold, the processor 330 may only answer the incoming call but does not initiate the second additional operation. That "when the value of the second pressure exceeds the second threshold, the processor 330 answers the incoming call and initiates the second additional operation" represents that whether the value of the second pressure exceeds the second threshold is a determining condition of whether the processor 330 initiates the second additional operation on the basis of answering the incoming call. That is, in this embodiment of the present disclosure, whether the processor 330 performs process of answering the incoming call may depend only on whether the touch sensor detects a particular touch operation on the answer icon 230. For example, if the terminal device 300 detects the second touch operation on the answer icon 230, and a value of pressure generated by the second touch operation is less than the second threshold (for example, the user touches the answer icon 230 lightly), the processor 330 may only answer the incoming call (that is, connect the incoming call) but does not initiate the second additional operation, and if the terminal device 300 detects the second touch operation on the answer icon 230 and a value of pressure generated by the second touch operation exceeds the second threshold (for example, the user presses the answer icon 230 heavily), the processor 330 may initiate the second additional operation on the basis of answering the incoming call, for example, enable the handsfree function. However, this is not limited in this embodiment of the present disclosure.

For a specific implementation manner of the terminal device 300, refer to the description about the terminal device 100 in the foregoing embodiment. For brevity, details are not described herein again.

Figure 6:
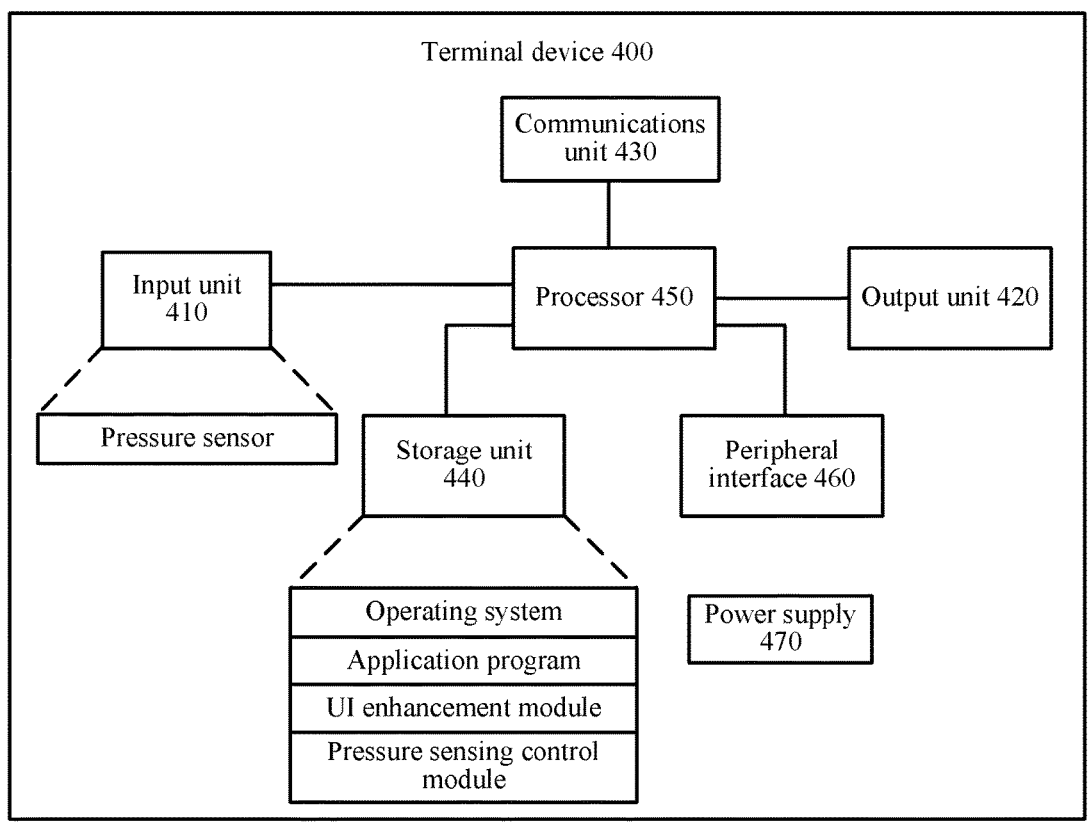
FIG. 6 is a schematic block diagram of a terminal device of another embodiment according to an embodiment of the present disclosure.

FIG. 6 shows an example of a structure of a terminal device 400 according to an embodiment of the present disclosure. The terminal device 400 may include components such as an input unit 410, an output unit 420, a communications unit 430, a storage unit 440, a processor unit 450, a peripheral interface 460, and a power supply 470. The input unit 410 may be configured to implement interaction between a user and the terminal device 400. The input unit 410 may be configured to receive digit or character information entered by a user to generate signal input related to a user setting or function control. Optionally, the input unit 410 may include a touch panel, various types of sensing components (for example, a pressure sensor), a substantive input key, a microphone, or another external information pick-up apparatus such as a camera. The substantive input key may include but is not limited to one or more of a physical keyboard, a function key (for example, a volume control key or a switch key), a trackball, a mouse, or a joystick. The microphone may be configured to collect voice input by a user or an environment and convert the voice into a command that is in a form of an electrical signal and that can be executed by a processor. However, this embodiment of the present disclosure is not limited thereto.

The output unit 420 may include but is not limited to an image output unit and an audio output unit. The image output unit may include a filter and an amplifier that are used to perform filtering processing and perform amplification processing on a video output by the processor. The audio output unit may include a digital-to-analog converter that is used to convert an audio signal output by the processor 450 from a digital format to an analog format. Optionally, the image output unit may include a single display or multiple displays of different sizes, for example, the touch display screen in FIG. 1 or FIG. 3. The display may be of a resistive type, a capacitive type, an infrared type, a surface acoustic wave type, or the like, for example, a liquid crystal display (LCD), an organic light-emitting diode (OLED), a field emission display (FED), an electrophoretic display, or a display using an interferometric modulation of light technology.

Optionally, the touch panel may also be used as a display. For example, after detecting a gesture operation of a user on the touch panel or a location near the touch panel, the touch panel transfers the gesture operation to the processor 450 to determine a type of the touch event, and then the processor 450 provides corresponding visual output to the display according to the type of the touch event. In addition, although in FIG. 6, the input unit 410 and the output unit 420 implement an input function and an output function of the terminal device 400 as two independent components, in some embodiments, the input unit 410 may be integrated with the output unit 420 to implement the input function and the output function of the terminal device. For example, the image output unit may display various graphical user interfaces (GUIs) as virtual control components, including but not limited to a window, a scroll bar, an icon, and a scrapbook, for a user to perform an operation by means of touch. However, this embodiment of the present disclosure is not limited thereto.

The communications unit 430 is configured to establish a communications channel such that the terminal device 400 is connected to a remote server using the communications channel and downloads media data from the remote server. The communications unit 430 may include a communications module such as a wireless local area network (WLAN) module, a BLUETOOTH module, or a baseband module, and a radio frequency (RF) circuit corresponding to the communications module, and is configured to perform wireless local area network communication, BLUETOOTH communication, infrared communication and/or cellular communications system communication, for example, Wideband Code Division Multiple Access (WCDMA) and/or High Speed Downlink Packet Access (HSDPA).

The communications unit 430 may be configured to control communication between components in the terminal device 400, and may support direct memory access. Various communications modules in the communications unit 430 generally appear in a form of an integrated circuit chip, and selective combination may be performed, and the communications unit does not necessarily include all communications modules and corresponding antenna groups. For example, the communications unit 430 may include only a baseband chip, an RF chip, and corresponding antennas, to provide a communication function in a cellular communications system. The terminal device 400 may be connected to a cellular network or the Internet using a wireless communication connection established by the communications unit (for example, WLAN access or WCDMA access). In some optional implementation manners of the present disclosure, some communications modules in the communications unit 430, for example, the baseband module, may be integrated into the processor 450. However, this embodiment of the present disclosure is not limited thereto.

The RF circuit may be configured to receive and send a signal during an information receiving and sending process or during a call, for example, receive downlink information of a base station and transmit the downlink information to the processor 400, and moreover, send uplink data to the base station. The RF circuit may include a known circuit for performing these functions, which includes but is not limited to an antenna system, an RF transceiver, one or more amplifiers, a tuner, one or more oscillators, a digital signal processor, a codec chip set, a subscriber identity module (SIM) card, a memory, and the like. In addition, the RF circuit may further communicate with a network and another device by means of wireless communication. The wireless communication may use any communications standard or protocol, which includes but is not limited to a Global system for mobile communications (GSM), a general packet radio service (GPRS), Code Division Multiple Access (CDMA), WCDMA, a High Speed Uplink Packet Access (HSUPA) technology, Long Term Evolution (LTE), and the like.

The storage unit 440 may include a data storage area and a program storage area. The program storage area is configured to store a software program (that is, at least one instruction) or module, for example, a sound playback program or an image display program. The data storage area may be configured to store data in the terminal device, for example, audio data, image data, and a phone book.

Further, the storage unit 440 may include a volatile memory, for example, a random access memory (RAM). The storage unit 440 may further include a non-volatile memory, for example, a non-volatile RAM (NVRAM), a Magnetoresistive RAM (MRAM), a phase change RAM (PRAM), a magnetic disk memory, an electrically erasable programmable read-only memory (EEPROM), or a flash memory (for example, a NOR flash memory or a NAND flash memory). Further, the non-volatile memory may be configured to store an instruction executed by the processing unit, for example, an operating system and an application program. The operating system may be configured to control and manage a normal system task (for example, memory management, storage device control, or power supply management) and various components and/or drivers that facilitate communication between various software and hardware. The application program may include any application installed in the terminal device, including but not limited to a browser, an email, an instant messaging service, text processing, keyboard virtualization, a window widget, encryption, digital copyright management, speech recognition, speech replication, positioning (for example, a function provided by a Global Positioning System (GPS)), music playing, and the like. However, this embodiment of the present disclosure is not limited thereto.

Optionally, the storage unit 440 may include a user interface (UI) enhancement module configured to improve a prompt function of an incoming call interface. When user input satisfies a specific condition (for example, a pressure change corresponding to an operation exceeds a preset threshold), an initiated additional operation or an operation result of an additional operation may be prompted to a user based on the original incoming call interface. This is not limited in this embodiment of the present disclosure.

Optionally, in another embodiment, the storage unit 440 may further include a pressure sensing control module (the pressure sensing control module may be an instruction stored in the storage unit 440). The processor 450 runs the instruction to compare a value of pressure with a preset threshold in order to determine whether to initiate an additional operation.

The processor 450 may be configured to execute an instruction stored in the memory in order to implement a corresponding function. For example, the processor 450 is further the processor in the foregoing embodiment. Optionally, the processor 450 may include a baseband processor and an application processor, or the baseband processor and the application processor may be integrated together. The processing unit may also include a subsystem including a low power-consuming processor that is used as a core, and another component (for example, an analog-to-digital converter), or may be a controller.

The power supply 470 is configured to supply power to different components of the terminal device 400 in order to keep the terminal device 400 running. It is generally understood that the power supply 470 may be a built-in battery such as a common lithium-ion battery or a nickel metal hydride (NiMH) battery, and may also include an external power supply, for example, an alternating current (AC) adapter, that directly supplies power to the terminal device 400. In some implementation manners of the present disclosure, the power supply 470 may be more widely defined, for example, may further include a power management system, a charging system, a power failure detection circuit, a power supply converter or inverter, a power supply status indicator (for example, a light-emitting diode), and any other component associated with generation, management, and distribution of electric energy of the terminal device.

Optionally, when the communications unit 430 receives an incoming call, the output unit 420 may display an incoming call interface, and the input unit 410 receives user input, obtains a tapping location, a gesture operation, and a pressure value. The storage unit 440 may store a determining program of a pressure sensing module and corresponding UI enhancement content. The processor 450 may run corresponding code, and process received information to generate and output a corresponding interface and data. Finally, the output unit 420 displays a current operation effect.

In this way, when receiving an incoming call, the communications unit 430 may trigger a display to display an incoming call interface. The incoming call interface includes an incoming call number, an answer icon, and a rejection icon. When the user operates an icon, the touch sensor may detect a location of a touch point of the user, and the pressure sensor may sense a change of resistance, capacitance, or inductance that is caused due to pressing and deformation, and may determine a pressure change by means of signal conversion. The processing unit (i.e., processor 450) may execute, with reference to the location of the touch point (or a track of the touch point) and the pressure change, a program that is stored in the storage unit 440 and that is related to pressure determining in order to determine a pressure force, and determine a program corresponding to the pressure force. Optionally, the pressure force may only include light touch and heavy pressing, or may be classified into multiple different levels according to sensitivity of the pressure sensor. Finally, the processing unit may give a processing result to the user using a display screen.

It should be noted that, the example in FIG. 6 is only intended to help a person skilled in the art better understand this embodiment of the present disclosure, but not to limit the scope of this embodiment of the present disclosure. A person skilled in the art can obviously make various equivalent modifications or changes according to the example given in FIG. 6. Such modifications or changes also fall within the scope of this embodiment of the present disclosure.

The terminal device provided in the embodiments of the present disclosure is described in detail above with reference to FIG. 1 to FIG. 6. An incoming call processing method provided in an embodiment of the present disclosure is described in detail below with reference to FIG. 7 and FIG. 8.

Figure 7:
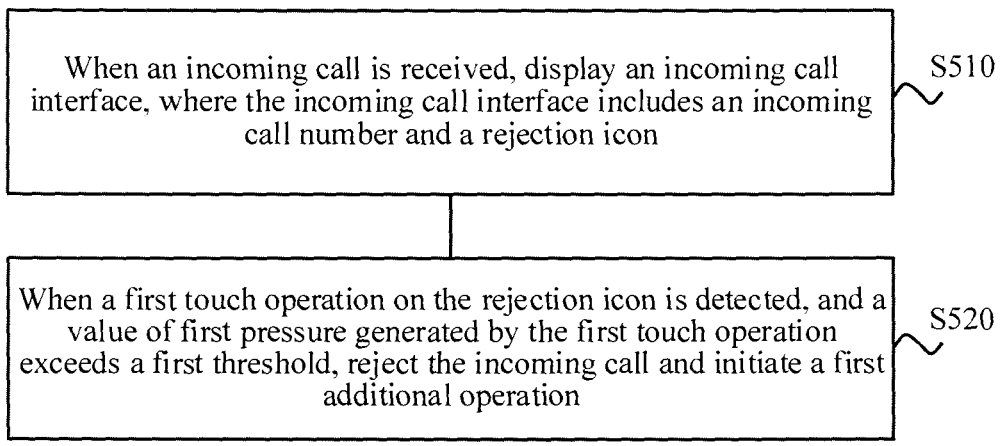
FIG. 7 is a schematic flowchart of incoming call processing according to an embodiment of the present disclosure.

FIG. 7 is a schematic flowchart of an incoming call processing method according to an embodiment of the present disclosure. The method may be performed by the terminal device. As shown in FIG. 7, the method includes the following steps.

Step S510: When an incoming call is received, display an incoming call interface, where the incoming call interface includes an incoming call number and a rejection icon.

Step S520: When a first touch operation on the rejection icon is detected, and a value of first pressure generated by the first touch operation exceeds a first threshold, reject the incoming call and initiate a first additional operation.

Optionally, the incoming call interface further includes an answer icon. In this case, the method further includes, when a second touch operation on the answer icon is detected, and a value of second pressure generated by the second touch operation exceeds a second threshold, answering the incoming call and initiating a second additional operation.

In an optional embodiment, reject the incoming call and initiate a first additional operation, include rejecting the incoming call and blacklisting the incoming call number.

In another optional embodiment, reject the incoming call and initiate a first additional operation, include rejecting the incoming call and setting a reminder event.

In another optional embodiment, reject the incoming call and initiate a first additional operation, include rejecting the incoming call and sending a default SMS message to the incoming call number.

In another optional embodiment, answering the incoming call and initiating a second additional operation include answering the incoming call and enabling a speaker.

In another optional embodiment, answering the incoming call and initiating a second additional operation include answering the incoming call and enabling recording.

Procedures and/or steps of the method in this embodiment of the present disclosure may be implemented by any one of the terminal devices in FIG. 1 to FIG. 6. For a corresponding part, refer to the foregoing apparatus embodiments. To avoid repetition, details are not described herein again.

Therefore, according to the incoming call processing method in this embodiment of the present disclosure, when receiving an incoming call, a terminal device displays an incoming call interface, and rejects the incoming call and initiates a first additional operation when detecting a first touch operation on a rejection icon, and a value of first pressure generated by the first touch operation exceeds a first threshold. A user does not need to perform operations multiple times, thereby further improving user experience.

Figure 8:
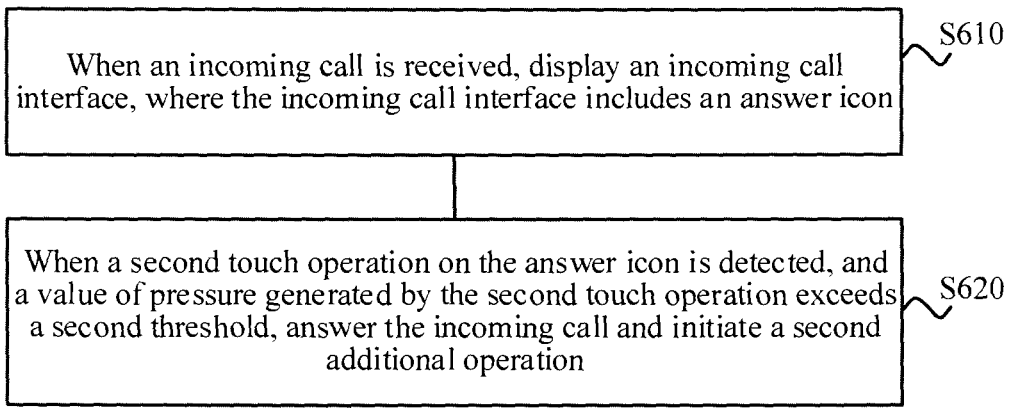
FIG. 8 is a schematic flowchart of incoming call processing according to another embodiment of the present disclosure.

FIG. 8 shows an incoming call processing method according to another embodiment of the present disclosure. The method may be performed by a terminal device. As shown in FIG. 8, the method includes the following steps.

Step S610: When an incoming call is received, display an incoming call interface, where the incoming call interface includes an answer icon.

Step S620: When a second touch operation on the answer icon is detected, and a value of pressure generated by the second touch operation exceeds a second threshold, answer the incoming call and initiate a second additional operation.

In an optional embodiment, answering the incoming call and initiating a second additional operation includes answering the incoming call and enabling a speaker.

In another optional embodiment, answering the incoming call and initiating a second additional operation includes answering the incoming call and enabling recording.

Procedures and/or steps of the method in this embodiment of the present disclosure may be implemented by any one of the terminal devices in FIG. 1 to FIG. 6. For a corresponding part, refer to the foregoing apparatus embodiments. To avoid repetition, details are not described herein again.

Therefore, according to the incoming call processing method in this embodiment of the present disclosure, when receiving an incoming call, a terminal device displays an incoming call interface, and answers the incoming call and initiates a second additional operation when detecting a second touch operation on an answer icon, and a value of pressure generated by the second touch operation exceeds a second threshold. A user does not need to perform operations multiple times, thereby further improving user experience.

In another optional embodiment, an embodiment of the present disclosure provides another incoming call processing method, including, when a touch display screen displays an incoming call interface, detecting a touch operation on the touch display screen, performing first processing according to the detected touch operation, where the first processing is processing of answering an incoming call or processing of rejecting an incoming call, determining a value of pressure generated by the touch operation, and if the value of the pressure generated by the touch operation exceeds a threshold, performing additional processing. In this way, if the value of the pressure exceeds the threshold, the additional processing is performed based on the first processing.

Further, the terminal device may detect a touch operation on an answer icon or a rejection icon on the touch display screen, and determine and perform the first processing according to the detected touch operation. For example, if the terminal device detects a touch operation on the answer icon, the terminal device performs processing of answering the incoming call (that is, connecting the incoming call), or if the terminal device detects a touch operation on the rejection icon, the terminal device performs processing of rejecting the incoming call (that is, hanging up the incoming call). However, this embodiment of the present disclosure is not limited thereto.

Optionally, performing additional processing if the value of the pressure generated by the touch operation exceeds a threshold includes, if the value of the pressure generated by the touch operation exceeds the threshold in first continuous duration, performing the additional processing. The first continuous duration exceeds a duration threshold.

In another optional embodiment, performing additional processing if the value of the pressure generated by the touch operation exceeds a threshold includes determining, from multiple preset pressure conditions, a target preset pressure condition that the value of the pressure generated by the touch operation satisfies, where each of the multiple preset pressure conditions corresponds to at least one preset additional processing, and performing at least one preset additional processing corresponding to the target preset pressure condition.

In another optional embodiment, if the first processing includes processing of answering the incoming call, the additional processing includes at least one of the following processing of enabling a speaker or enabling a recorder.

In another optional embodiment, if the first processing includes processing of rejecting the incoming call, the additional processing includes at least one of the following processing of blacklisting an incoming call number, returning a default SMS message to the incoming call number, opening an SMS message edit box used to send an SMS message to the incoming call number, or setting a reminder event used to remind a user to call the incoming call number back or return an SMS message to the incoming call number.

Procedures and/or steps of the method in this embodiment of the present disclosure may be implemented by any one of the terminal devices in FIG. 1 to FIG. 6. For a corresponding part, refer to the foregoing apparatus embodiments. To avoid repetition, details are not described herein again.

Therefore, according to the incoming call processing method in this embodiment of the present disclosure, when a display screen displays an incoming call interface, a touch operation of a user on an answer icon or a rejection icon in the incoming call interface is detected, and when a value of pressure generated by the detected touch operation exceeds a threshold, an additional operation is performed on the basis of connecting the call or hanging up the call. A user does not need to perform operations multiple times, thereby further improving user experience.

It should be understood that, sequence numbers of the foregoing processes do not mean execution sequences. The execution sequences of the processes should be determined according to functions and internal logic of the processes, and should not be construed as any limitation on the implementation processes of the embodiments of the present disclosure.

A person of ordinary skill in the art may be aware that, the method steps and units described in the embodiments disclosed in this specification may be implemented by a combination of electronic hardware and software.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware and software.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A terminal device, comprising:
   a touch display screen configured to display an incoming call interface comprising an incoming call number and a rejection icon when the terminal device receives an incoming call;
   a pressure sensor coupled to the touch display screen and configured to determine a first pressure value generated from a first touch operation when the terminal device detects the first touch operation on the rejection icon; and
   a processor coupled to the touch display screen and the pressure sensor and configured such that in response to the terminal device detecting the first touch operation on the rejection icon, the processor:
      rejects the incoming call; and
      initiates a first additional operation when the first pressure value exceeds a first threshold.

2. The terminal device according to claim 1, wherein the incoming call interface further comprises an answer icon, wherein the pressure sensor is further configured to determine a second pressure value generated from a second touch operation when the terminal device detects the second touch operation on the answer icon, and wherein the processor is further configured such that in response to the terminal device detecting the second touch operation on the answer icon, the processor:
      answers the incoming call; and
      initiates a second additional operation when the second pressure value exceeds a second threshold,
   wherein the processor answers the incoming call without initiating the second additional operation when the second pressure value does not exceed the second threshold.

3. The terminal device according to claim 2, wherein when answering the incoming call and initiating the second additional operation, the processor is further configured to:
      answer the incoming call; and
      enable a handsfree function after answering the incoming call when the second pressure value exceeds the second threshold.

4. The terminal device according to claim 2, wherein when answering the incoming call and initiating the second additional operation, the processor is further configured to:
      answer the incoming call; and
      enable recording after answering the incoming call when the second pressure value exceeds the second threshold.

5. The terminal device according to claim 1, wherein the processor is further configured to:
      reject the incoming call without initiating the first additional operation when the first pressure value does not exceed the first threshold; and
      initiate the first additional operation after rejecting the incoming call when the first pressure value exceeds the first threshold, wherein initiating the first additional operation includes blacklisting the incoming call number.

6. The terminal device according to claim 1, wherein when rejecting the incoming call and initiating the first additional operation, the processor is further configured to:
      reject the incoming call; and
      set a reminder event after rejecting the incoming call.

7. The terminal device according to claim 1, wherein when rejecting the incoming call and initiating the first additional operation, the processor is further configured to:
      reject the incoming call; and
      send a default short message service (SMS) message to the incoming call number after rejecting the incoming call.

8. The terminal device according to claim 1, wherein the terminal device is configured to determine whether the incoming call number is fraudulent, and wherein the processor is further configured such that when the terminal device determines that the incoming call number is a fraudulent number, the processor rejects the incoming call and initiates the first additional operation even when the first pressure value does not exceed the first threshold.

9. The terminal device according to claim 8, wherein the processor initiates the additional operation by blacklisting the incoming call number.

10. A terminal device, comprising:
    a touch display screen configured to display an incoming call interface comprising an answer icon when the terminal device receives an incoming call;
    a pressure sensor coupled to the touch display screen and configured to determine a value of pressure generated from a first touch operation when the terminal device detects the first touch operation on the answer icon; and
    a processor coupled to the touch display screen and the pressure sensor and configured such that responsive to the terminal device detecting the first touch operation on the answer icon, the processor:
       answers the incoming call; and
       initiates a first additional operation when the value of the pressure generated from the first touch operation exceeds a first threshold, wherein the processor is configured to answer the incoming call without initiating the first additional operation when the value of the pressure does not exceed the first threshold, and when the value of the pressure exceeds the first threshold, the processor is further configured to:
       answer the incoming call; and
       enable a handsfree function after answering the incoming call.

11. The terminal device according to claim 10, wherein when answering the incoming call and initiating the first additional operation when the value of the pressure exceeds the first threshold, the processor is further configured to:
    answer the incoming call; and
    enable recording after answering the incoming call.

12. An incoming call processing method implemented by a terminal device, the method comprising:

displaying, on a touch display screen of the terminal device, an incoming call interface comprising an incoming call number and a rejection icon when the terminal device receives an incoming call;

rejecting the incoming call when the terminal device detects a first touch operation on the rejection icon; and initiating a first additional operation when a first pressure value exceeds a first threshold, the first pressure value being generated from the first touch operation on the rejection icon.

13. The method according to claim 12, wherein the incoming call interface further comprises an answer icon, and wherein the method further comprises:

answering the incoming call when a second touch operation is detected on the answer icon; and initiating a second additional operation when a second pressure value exceeds a second threshold, the second pressure value being generated from the second touch operation on the answer icon, wherein the incoming call is answered without initiating the second additional operation when the second pressure value does not exceed the second threshold.

14. The method according to claim 13, wherein initiating the second additional operation comprises:

enabling a speaker after answering the incoming call.

15. The method according to claim 13, wherein initiating the second additional operation comprises:

enabling recording after answering the incoming call.

16. The method according to claim 12, wherein initiating the first additional operation comprises:

blacklisting the incoming call number after rejecting the incoming call.

17. The method according to claim 12, wherein initiating the first additional operation comprises:

setting a reminder event after rejecting the incoming call.

18. The method according to claim 12, wherein initiating the first additional operation comprises:

sending a default short message service (SMS) message to the incoming call number after rejecting the incoming call.

19. The method according to claim 12, further comprising simultaneously rejecting the incoming call and initiating the first additional operation when the first pressure value exceeds the first threshold, wherein initiating the first additional operation comprises:

setting a reminder event associated with the incoming call number; or sending a default short message service (SMS) message to the incoming call number.

\* \* \* \* \*